(12) United States Patent
Suzuki

(10) Patent No.: US 7,494,261 B2
(45) Date of Patent: Feb. 24, 2009

(54) PROJECTOR

(75) Inventor: Masakazu Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 93 days.

(21) Appl. No.: 11/727,780

(22) Filed: Mar. 28, 2007

(65) Prior Publication Data

US 2007/0230192 A1    Oct. 4, 2007

(30) Foreign Application Priority Data

Mar. 31, 2006    (JP)    ............................. 2006-098991

(51) Int. Cl.
*F21V 33/00*    (2006.01)
(52) U.S. Cl. ........................ 362/647; 362/362; 362/285; 362/640
(58) Field of Classification Search ................. 362/548, 362/362, 382, 457, 458, 285, 640, 647
See application file for complete search history.

(56) References Cited

U.S. PATENT DOCUMENTS

2002/0075687 A1    6/2002    Payne
2003/0124947 A1    7/2003    Liu et al.

FOREIGN PATENT DOCUMENTS

JP    2001-092009    4/2001
JP    2004-264387    9/2004
WO    2004109737 A2    12/2004

*Primary Examiner*—Laura Tso
(74) *Attorney, Agent, or Firm*—Pillsbury Winthrop Shaw Pittman LLP

(57) ABSTRACT

In order for a tip end portion of a holding plate not to catch up on a cover glass holder when a lamp unit is stored in a lamp storage unit, a surface of the cover glass holder which confronts the holding plate is processed into a shape which does not project, in concrete terms, into the shape of a curved surface or the shape of a sloping plane. By doing this, even though the tip end portion of the holding plate strikes against the cover glass holder, since it passes smoothly thereover without catching up thereupon, accordingly, it is possible for the lamp unit to be smoothly stored in the lamp storage unit.

4 Claims, 7 Drawing Sheets

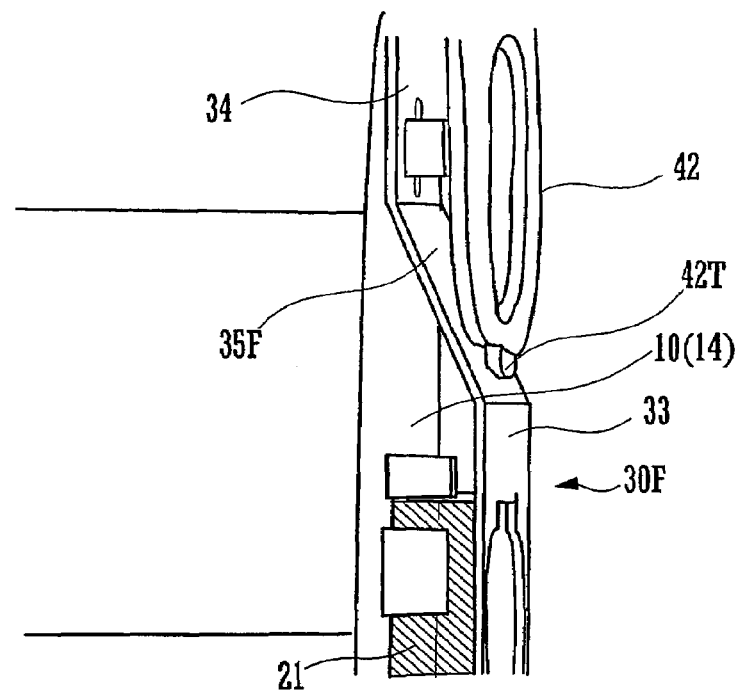
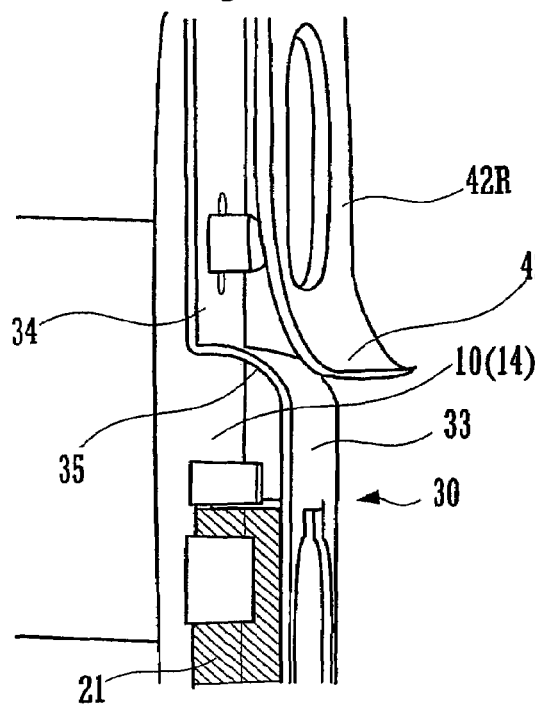
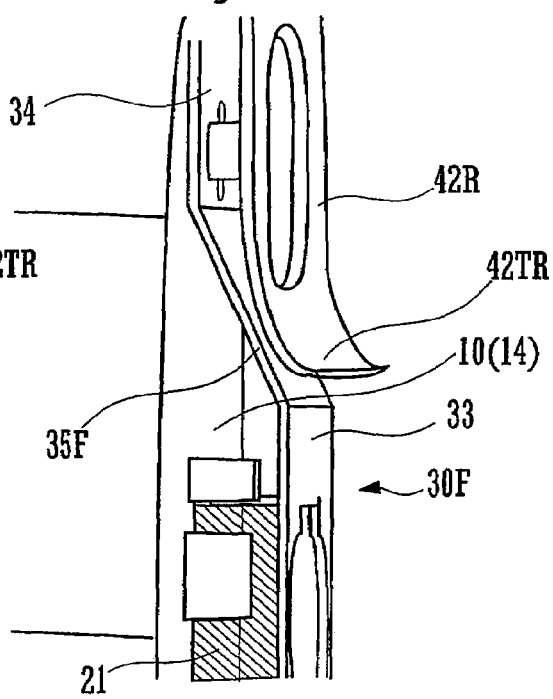

PROJECTOR

CROSS REFERENCE

This Nonprovisional application claims priority under 35 U.S.C. § 119(a) on Patent Application No. 2006-098991 filed in Japan on Mar. 31, 2006, the entire contents of which are hereby incorporated by reference.

BACKGROUND OF THE INVENTION

The present invention relates to a removable and replaceable construction for the lamp unit of a projector.

Recently, a type of projector has become widespread which irradiates light from a lamp upon a picture display device such as a digital micromirror device (DMD) or a liquid crystal display device or the like, and projects a picture which is displayed upon this picture display device upon a screen.

Since, with a projector, sometimes the amount of light which is emitted by the lamp used as a light source may drop, or for one reason or another the lamp may break, accordingly, as described in Japanese Laid-Open Patent Publication 2001-92009 or Japanese Laid-Open Patent Publication 2004-264387, structures have been proposed in which it is possible to exchange the lamp unit.

With a prior art projector, in order to make the structure more compact, a structure is often employed in which the lamp unit is stored in a lamp storage unit in a state in which the optical axis of the lamp unit is tilted. However, when this type of structure is adopted, when storing the lamp unit in the lamp storage unit, it is necessary to do so with the lamp unit in a tilted state, and this is an extremely difficult task from the point of view of the user. Furthermore there has been the problem that, when the user is storing the lamp unit in the lamp storage unit, the lamp unit may strike some other component such as the wall surface of the lamp storage unit, so that sometimes it has not been possible to store the lamp unit in the lamp storage unit in a smooth manner.

The object of the present invention is to provide a projector with which, even though a structure is employed in which the lamp unit is stored as being tilted with respect to the projector, still it is possible to store the lamp unit in a smooth manner.

SUMMARY OF THE INVENTION

With the projector of the present invention, the lamp unit is made so as to be stored in the lamp storage unit in a state of being tilted at a fixed angle, and so as to be capable of being fitted thereto and removed therefrom. Furthermore, in the state in which the lamp unit is stored in the lamp storage unit, a holding plate, a tip end portion of which extends out in the direction in which the lamp unit is removed, contacts against a cover glass holder and holds the lamp unit. Moreover, a surface of the cover glass holder which, when the lamp unit is fitted, faces the tip end portion of the holding plate, is processed into the shape of a curved surface which is convex towards the side of the holding plate.

Thus, when the lamp unit is fitted to the lamp storage unit, even though the tip end portion of the holding plate strikes against the cover glass holder, the tip end portion of the holding plate does not catch up upon this surface of the cover glass holder, which has been processed into the shape of a curved surface, but rather is able to pass smoothly thereover. Due to this, it is possible to fit the lamp unit to the lamp storage unit in a smooth manner.

BRIEF DESCRIPTION OF THE DRAWINGS

FIG. 7A is an enlarged view showing a wheel cover and a cover glass holder of a different shape to FIGS. 6A and 6B;

FIG. 7B is an enlarged view showing a wheel cover and a cover glass holder of another different shape to FIGS. 6A and 6B; and FIG. 7C is an enlarged view showing a wheel cover and a cover glass holder of yet another different shape to FIGS. 6A and 6B.

DETAILED DESCRIPTION OF THE INVENTION

Figure 1:
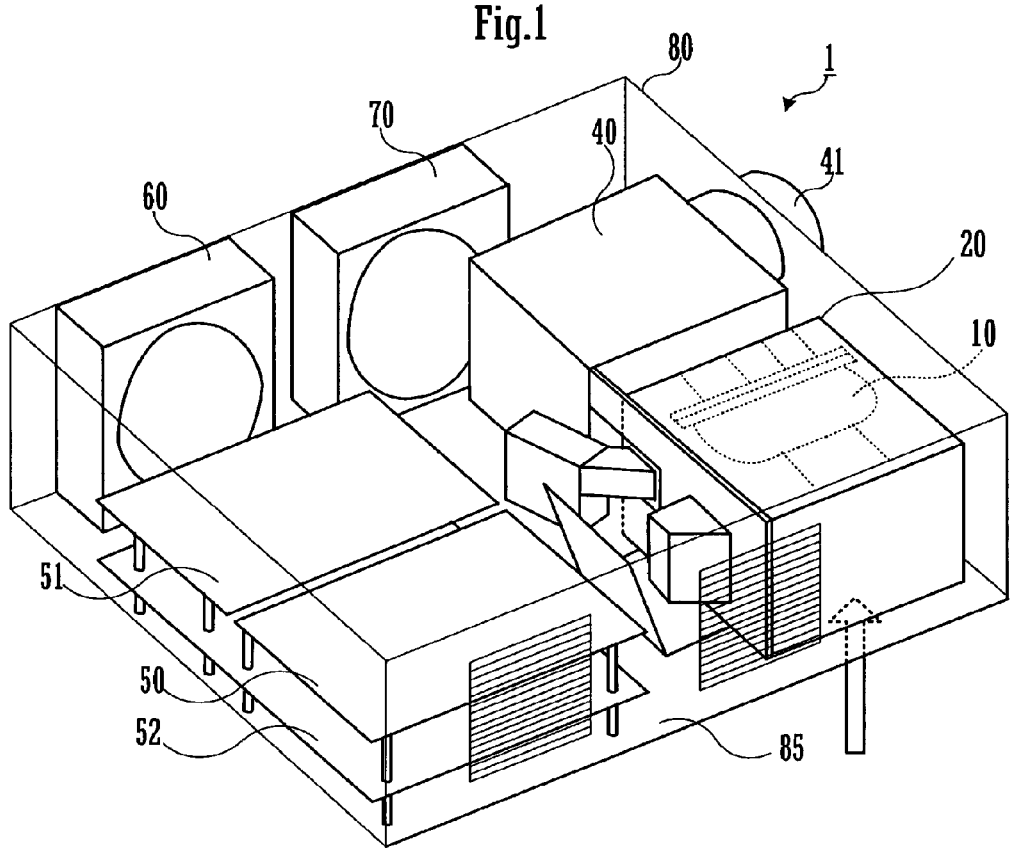
FIG. 1 is a perspective view showing the schematic interior construction of a projector.

FIG. 1 is a perspective view showing the schematic interior construction of a projector. This projector 1 comprises a lamp unit 10, a picture projection unit 40, power supply circuit boards 50 and 51, a control circuit board 52, and main fans 60 and 70. All of these are fitted to a chassis 80.

The lamp unit 10 projects light for picture projection. Furthermore, the lamp unit 10 is stored within a lamp storage unit 20, and is freely removable and replaceable through the bottom surface 85 of the main body of the projector 1 (in the direction shown by the arrow sign in FIG. 1).

The picture projection unit 40 comprises a picture display device such as a DMD or the like and a color wheel (neither of which is shown in the figures). This picture projection unit 40 projects a picture formed upon the picture display device from a projection lens 41, using light from the lamp unit 10.

Figure 2A:
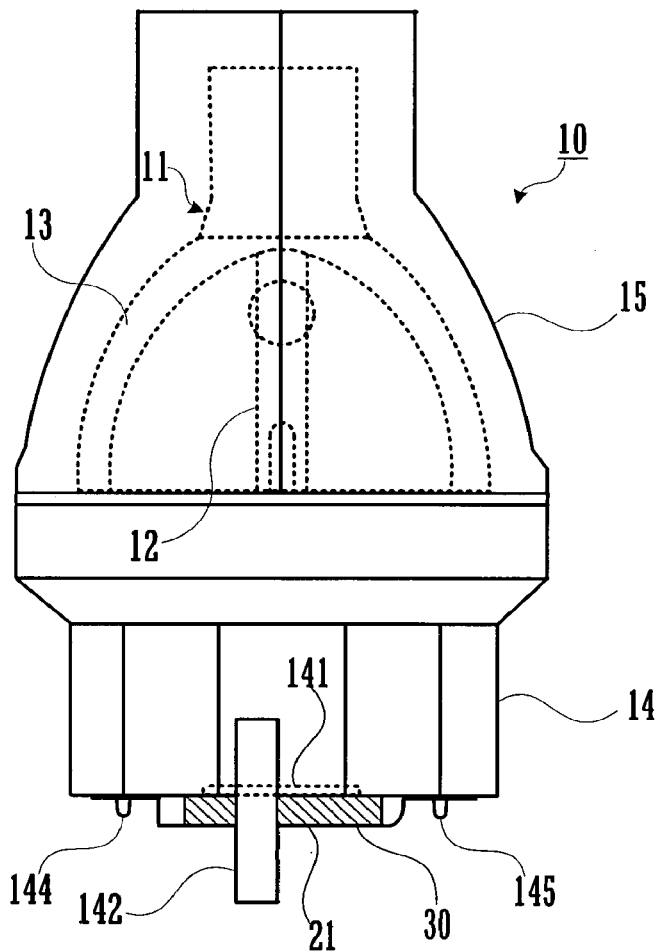
FIG. 2A is a side view showing the schematic structure of a lamp unit.
Figure 2B:
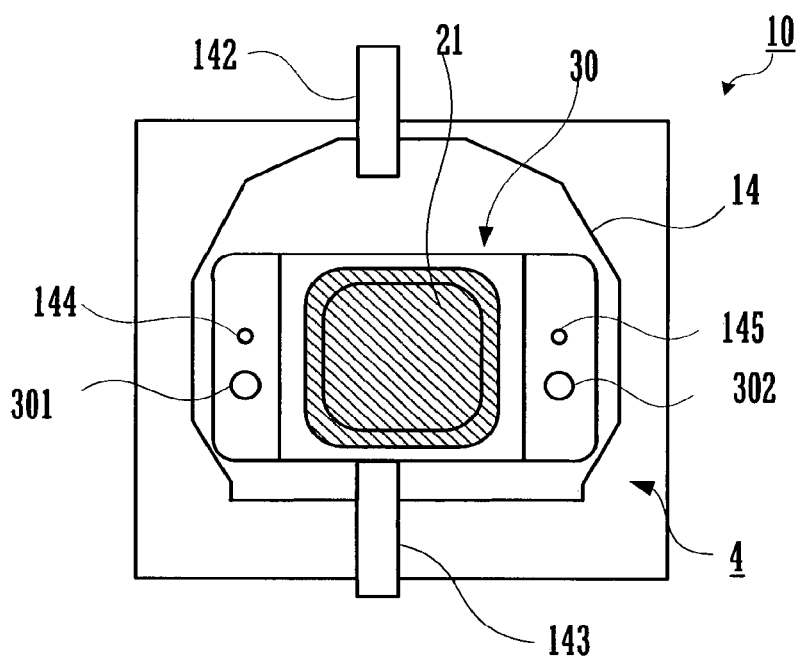
FIG. 2B is an elevation view showing the schematic structure of the lamp unit.

FIGS. 2A and 2B are respectively a side view and an elevation view, both showing the schematic structure of the lamp unit 10. And FIG. 3 is a perspective view showing the general appearance of a cover glass holder.

As shown in FIGS. 2A and 2B, the lamp unit 10 comprises a lamp 11 incorporating a lamp bulb 12 and a reflector 13, a front cover 14, a rear cover 15, a cable not shown in the figures for supplying electrical power to the lamp valve 12, and the like. The front cover 14 is fitted to the front side of the lamp 11. And the rear cover 15 is fitted to the rear side of the lamp 11.

Fixing projections 142, 143 are formed upon the front cover 14 for fixing the lamp unit 10 when it is stored in the lamp storage unit 20 of the projector 1. Furthermore, in the central front surface portion of the front cover 14, there is formed a projection aperture 141, through which the light from the lamp bulb 12 is projected. Moreover, a cover glass 21 is fitted in the front of this projection aperture 141. In addition, a cover glass holder 30 is fitted to the front side of this cover glass 21. This cover glass holder 30 holds the cover glass 21 to the front cover 14. Furthermore, the cover glass holder 30 is fixed to the front cover 14 by pins 144, 145 and screws 301, 302.

Figure 3:
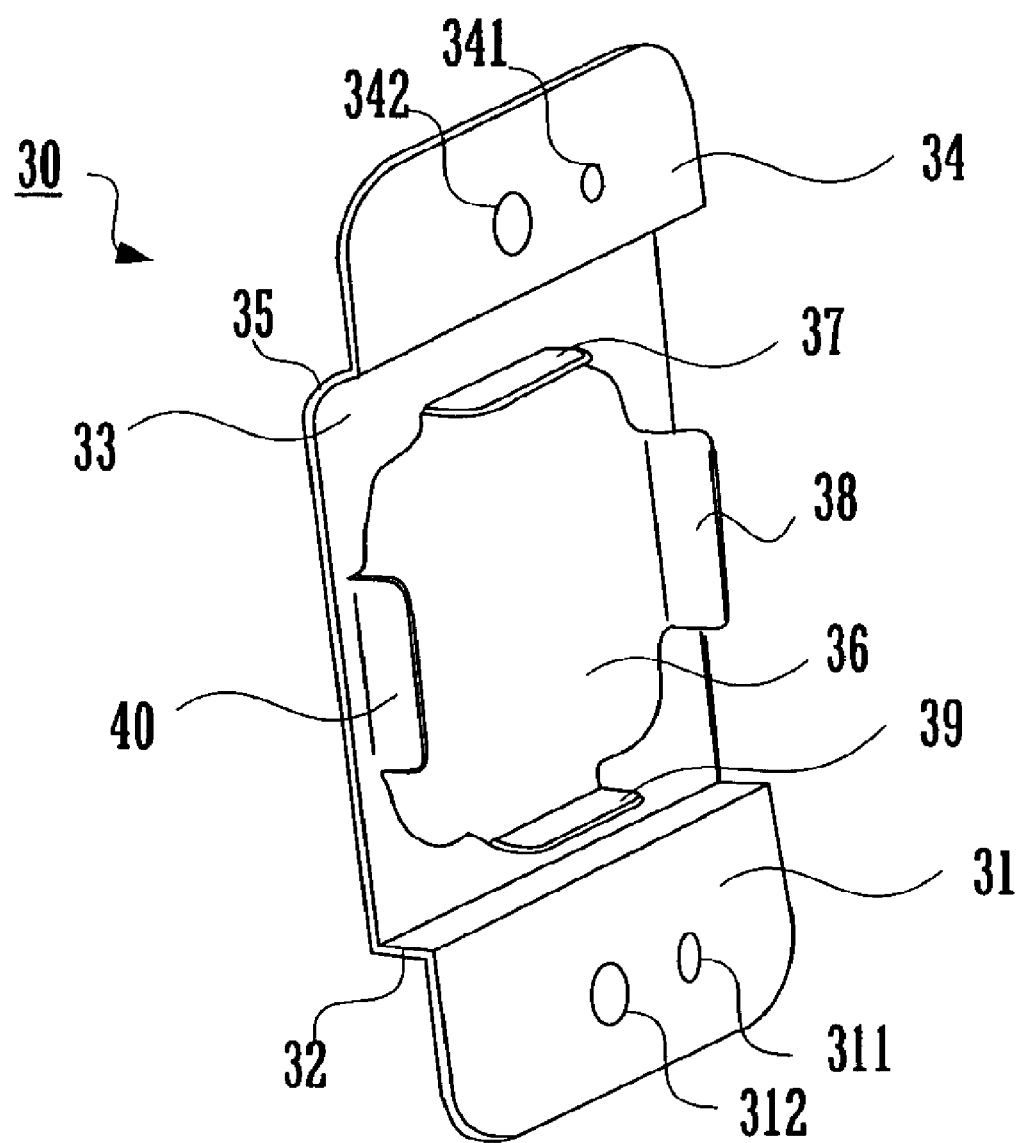
FIG. 3 is a perspective view showing the general appearance of a cover glass holder.

As shown in FIG. 3, the cover glass holder 30 is made by folding and bending processing a single thin metallic plate into a convex shape, and it is principally defined by plane surfaces 31 through 34 and a curved surface 35. A hole 36 is formed in the center of the surface 33, and flanges 37 through 40 are formed around the periphery of this hole 36 for holding the edges of the cover glass 21. Moreover, holes 311, 312, 341, and 342 are formed in the cover glass holder 30 for fixing this cover glass holder 30 to the front surface of the front cover 14 with the pins 144, 145 and the screws 301, 302.

Figure 4A:
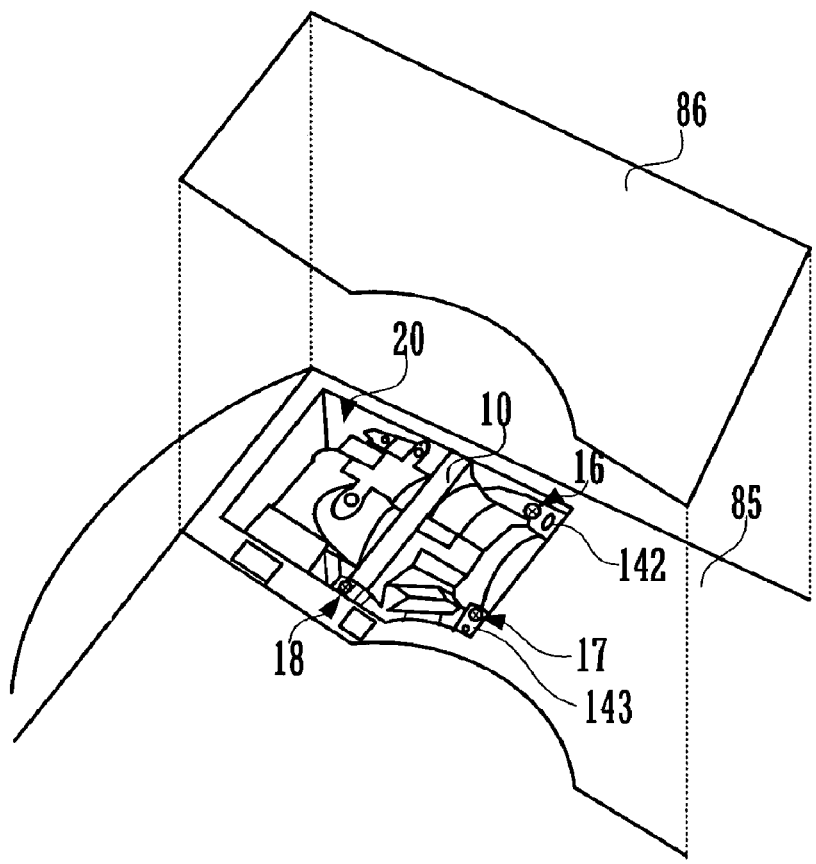
FIG. 4A is a figure showing a situation in which a lamp unit is stored in a lamp storage unit.
Figure 4B:
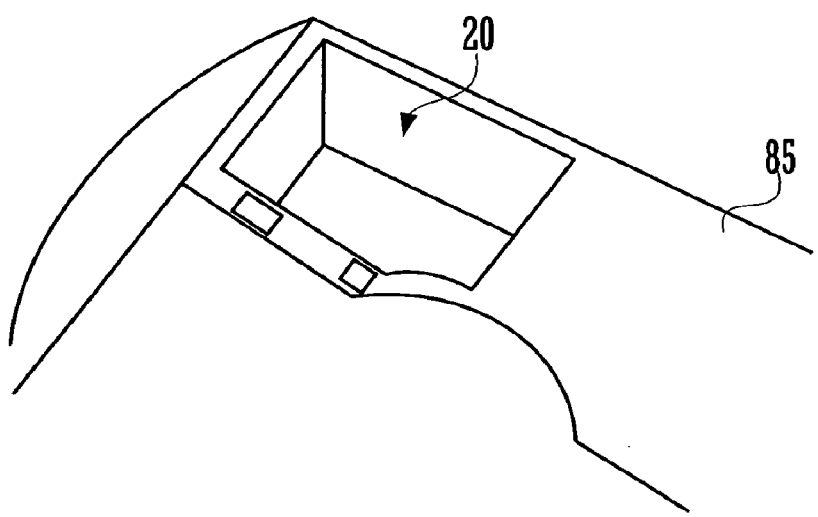
FIG. 4B is a figure showing a situation in which the lamp unit has been taken out from the lamp storage unit.

FIGS. 4A and 4B are figures respectively showing a situation in which the lamp unit 10 is stored in the lamp storage unit 20, and a situation in which the lamp unit 10 has been taken out from the lamp storage unit 20.

This projector 1 is made so that the lamp unit 10 can be removed from and replaced back into the lamp storage unit 20, from the bottom surface of the main body of the projector 1. Normally, a cover 86 is fitted to the bottom surface 85 of the projector 1, so as to cover over the lamp storage unit 20. When the user removes this cover 86, as shown in FIG. 4A, the lamp storage unit 20 becomes visible. Furthermore, when he removes the lamp unit 10 from the lamp storage unit 20, as shown in FIG. 4B, the interior of the lamp storage unit 20 becomes an empty cavity.

If the lamp unit 11 fails or the amount of light which it emits drops, then the user removes the cover 86, and is then able to remove the lamp unit 10 from the lamp storage unit 20 by taking out the screws 16-18 which fix the fixing projections 142, 143 and so on.

Figure 5:
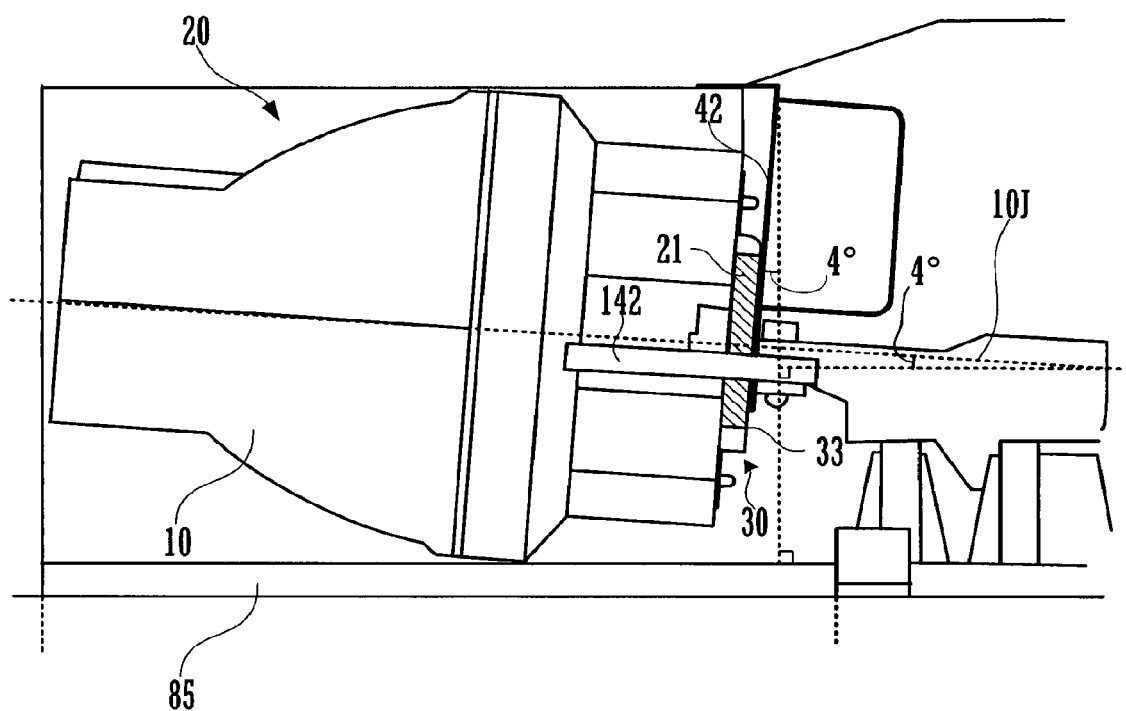
FIG. 5 is a cutaway side view showing the situation in which the lamp unit is stored in the lamp storage unit.

FIG. 5 is a cutaway side view showing the situation in which the lamp unit 10 is stored in the lamp storage unit 20. As shown in FIG. 5, when the lamp unit 10 is stored in the lamp storage unit 20, the surface 33 of the cover glass holder 30 fitted to the front surface of the lamp unit 10 is contacted against a wheel cover 42. Furthermore, the surface 33 of the cover glass holder 30 is in the state of being pressed by the wheel cover 42. In the state in which the lamp unit 10 is stored in the lamp storage unit 20, the optical axis 10J of the lamp unit 10 comes to be in a state of being inclined by, for example, about 4° with respect to the main body bottom surface 85, so that the front surface of the lamp unit 10 points somewhat downwards. And the wheel cover 42 extends out in the direction to remove the lamp unit 10, and is inclined at about 4° with respect to a line perpendicular to the main body bottom surface 85.

Figure 6A:
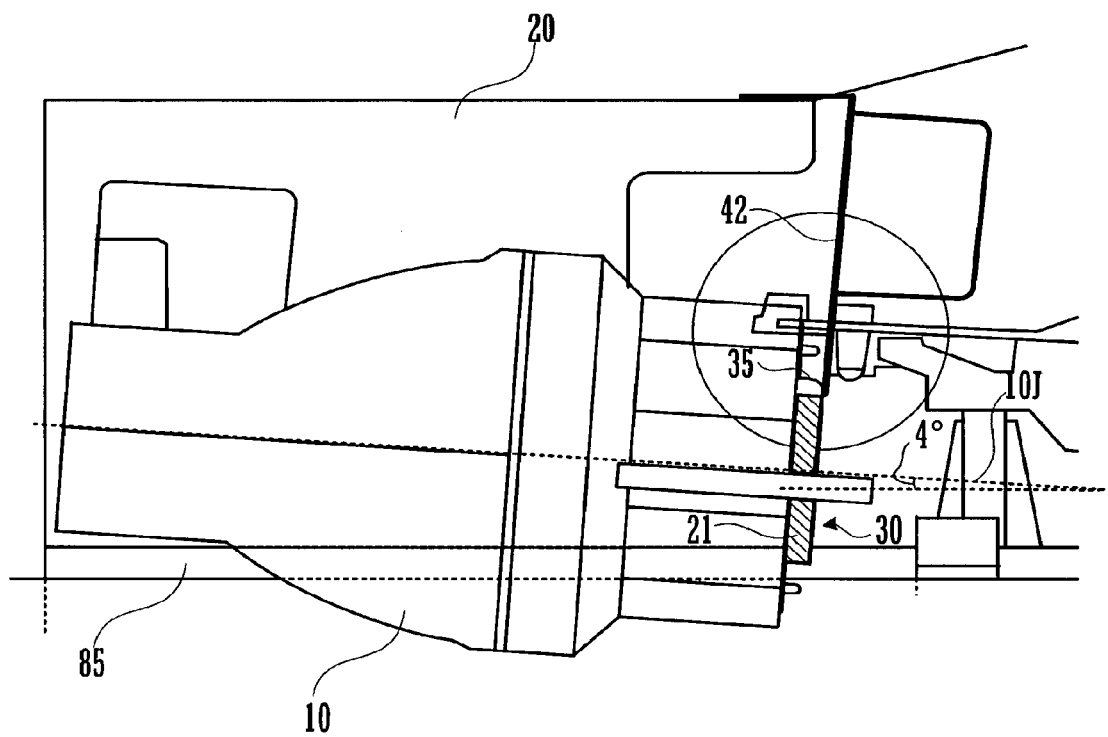
FIG. 6A is a cutaway side view showing a situation in which the lamp unit is partway through being stored in the lamp storage unit.
Figure 6B:
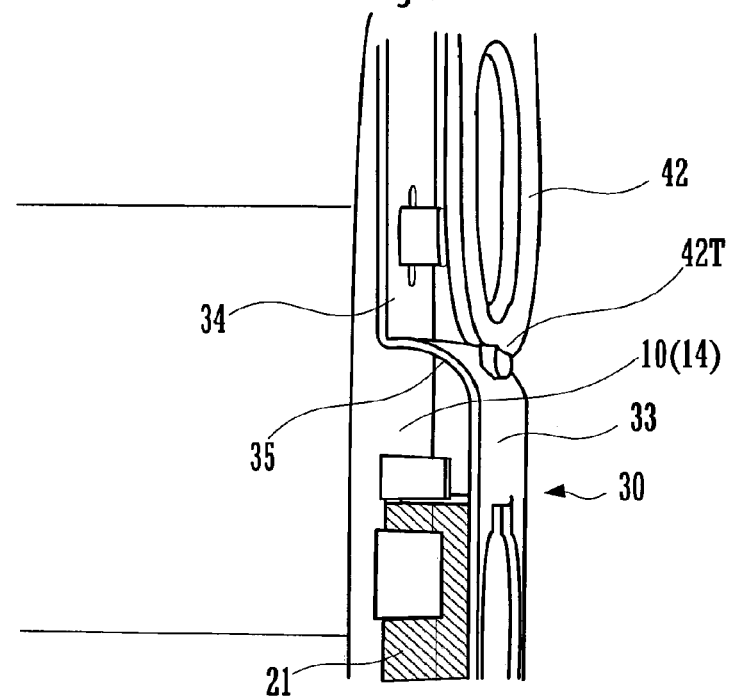
FIG. 6B is an enlarged view showing a state in which a tip end portion of a wheel cover and the cover glass holder are contacted together.

FIGS. 6A and 6B are respectively a cutaway side view showing a situation in which the lamp unit 10 is partway through being stored in the lamp storage unit 20, and an enlarged view showing a state in which a tip end portion of the wheel cover 42 and the cover glass holder 30 are contacted together. With the present invention, as shown in FIGS. 6A and 6B, the surface 35 of the cover glass holder 30 is formed in the shape of a curved surface, so as to be convex towards its side which faces towards the wheel cover 42. Due to this, when the user stores the lamp unit 10 in the lamp storage unit 20, even though the tip end portion 42T of the wheel cover 42 strikes the cover glass holder 30, this tip end portion 42T passes smoothly over the surface 35 of the cover glass holder 30 and does not catch up thereupon. Accordingly, it is possible to store the lamp unit 10 in the lamp storage unit 20 in a smooth manner.

Furthermore, it would also be possible to make the shape of the cover glass holder 30, or the shape of the tip end portion of the wheel cover 42, in some different shape. FIGS. 7A, 7B and 7C consists of three enlarged views of wheel covers and cover glass holders which are in different shapes from those shown in FIGS. 6A and 6B. For example, as with the cover glass holder 30F shown in FIG. 7A, it would be acceptable to form the surface 35 not as a curved surface, but rather as a sloping plane 35F which connects the surface 33 and the surface 34. By doing this, when the user stores the lamp unit 10 in the lamp storage unit 20, even though the tip end portion 42T of the wheel cover 42 strikes the cover glass holder 30, this tip end portion 42T passes smoothly up over the surface 35F of the cover glass holder 30 and does not catch up thereupon. Accordingly, the user is able to store the lamp unit 10 in the lamp storage unit 20 in a smooth manner.

Furthermore, as in the case of the wheel cover 42R shown in FIGS. 7B and 7C, it would also be acceptable to arrange to perform a bending process upon the tip end portion 42TR, so as to form it into the shape of a curved surface which is convex towards the side of the cover glass holder 30.

Due to this, when the user stores the lamp unit 10 in the lamp storage unit 20, even though the tip end portion 42TR of the wheel cover 42R strikes the cover glass holder 30 or the cover glass holder 30F, nevertheless this tip end portion 42TR passes smoothly up over the surface 34 or 35F of the cover glass holder 30 or 30F, and does not catch up thereupon. Accordingly, the user is able to store the lamp unit 10 in the lamp storage unit 20 in a smooth manner.

As described above, since, with the present invention, the cover glass holder which is fitted to the front surface of the lamp unit 10, or the wheel cover, is formed as a curved surface or a sloping surface, accordingly, even though the lamp unit 10 is made so as to be stored in the lamp storage unit 20 in a tilted state with respect to the bottom surface of the projector 1, it is still possible to store the lamp unit 10 without the tip end portion 42T of the wheel cover 42 catching up upon the cover glass holder. Accordingly, it is possible for the user to exchange the lamp unit 10 in a smooth manner.

Finally, in the above described explanation of an embodiment of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

The invention claimed is:

1. A projector, comprising:
   a lamp storage unit to which a lamp unit which emits light for projecting a picture towards a screen can be freely fitted and removed, and which stores this lamp unit in a state of being tilted at a fixed angle; and
   a holding plate, having a tip end portion of which extends out in the direction in which said lamp unit is removed, and which contacts a cover glass holder which fixes a cover glass provided to a light beam projection aperture formed in a front surface of said lamp unit, thus holding said lamp unit;
   wherein a surface of said cover glass holder which, when said lamp unit is fitted, faces said tip end portion of said holding plate, is modified into the shape of a curved surface which is convex towards the side of said holding plate.

2. A projector, comprising:
   a lamp storage unit to which a lamp unit which emits light for projecting a picture towards a screen can be freely fitted and removed, and which stores this lamp unit in a state of being tilted at a fixed angle; and
   a holding plate, having a tip end portion of which extends out in the direction in which said lamp unit is removed, and which contacts a cover glass holder which fixes a cover glass provided to a light beam projection aperture formed in a front surface of said lamp unit, thus holding said lamp unit;

wherein a surface of said cover glass holder which, when said lamp unit is fitted, faces said tip end portion of said holding plate, is modified into the shape of a sloping plane which is sloped towards the side of said lamp unit.

3. A projector as described in claim 1, wherein the vicinity of the end of said holding plate is modified by bending into the shape of a curved surface.

4. A projector as described in claim 2, wherein the vicinity of the end of said holding plate is modified by bending into the shape of a curved surface.

* * * * *